(12) United States Patent
Rabinowitz et al.

(10) Patent No.: US 7,463,195 B2
(45) Date of Patent: Dec. 9, 2008

(54) POSITION LOCATION USING GLOBAL POSITIONING SIGNALS AUGMENTED BY BROADCAST TELEVISION SIGNALS

(75) Inventors: Matthew Rabinowitz, Portola Valley, CA (US); James J. Spilker, Jr., Woodside, CA (US)

(73) Assignee: Rosum Corporation, Mountain View, CA (US)

( * ) Notice: Subject to any disclaimer, the term of this patent is extended or adjusted under 35 U.S.C. 154(b) by 1705 days.

(21) Appl. No.: 10/159,478

(22) Filed: May 31, 2002

(65) Prior Publication Data

US 2002/0199196 A1 Dec. 26, 2002

Related U.S. Application Data

(63) Continuation-in-part of application No. 09/887,158, filed on Jun. 21, 2001, now abandoned.

(60) Provisional application No. 60/361,762, filed on Mar. 4, 2002, provisional application No. 60/353,440, filed on Feb. 1, 2002, provisional application No. 60/332,504, filed on Nov. 13, 2001.

(51) Int. Cl.
*G01S 3/02* (2006.01)
(52) U.S. Cl. .................. 342/465; 342/463; 342/464
(58) Field of Classification Search ................ 342/453, 342/457, 463, 464, 357.01, 357.06, 465; 701/207, 213
See application file for complete search history.

(56) References Cited

U.S. PATENT DOCUMENTS 4,652,884 A 3/1987 Starker (Continued)

FOREIGN PATENT DOCUMENTS

DE 3242997 A1 5/1984

(Continued)

OTHER PUBLICATIONS

Li, X., et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18-21, pp. 1449-1453, vol. 2, XPO10520871, 2000, Piscataway, NJ, USA, IEEE, USA, ISBN; 9-7803-6463-5, Chapter I and III.

(Continued)

*Primary Examiner*—Dao L. Pham
(74) *Attorney, Agent, or Firm*—Richard A. Dunning, Jr.

(57) ABSTRACT

A method, apparatus, and computer-readable media for determining the position of a user terminal comprises receiving at the user terminal a broadcast television signal from a television signal transmitter; determining a first pseudo-range between the user terminal and the television signal transmitter based on a known component of the broadcast television signal; receiving at the user terminal a global positioning signal from a global positioning satellite; determining a second pseudo-range between the user terminal and the global positioning satellite based on the global positioning signal; and determining a position of the user terminal based on the first and second pseudo-ranges, a location of the television signal transmitter, and a location of the global positioning satellite.

34 Claims, 5 Drawing Sheets

U.S. PATENT DOCUMENTS

| | | | |
|---|---|---|---|
| 4,700,306 A | 10/1987 | Wallmander | |
| 4,894,662 A | 1/1990 | Counselman | |
| 5,157,686 A | 10/1992 | Omura et al. | |
| 5,166,952 A | 11/1992 | Omura et al. | |
| 5,271,034 A | 12/1993 | Abaunza | |
| 5,323,322 A | 6/1994 | Mueller et al. | |
| 5,398,034 A | 3/1995 | Spilker, Jr. | |
| 5,504,492 A | 4/1996 | Class et al. | |
| 5,604,765 A | 2/1997 | Bruno et al. | |
| 5,630,206 A | 5/1997 | Urban et al. | |
| 5,648,982 A | 7/1997 | Durrant et al. | |
| 5,774,829 A | 6/1998 | Cisneros et al. | |
| 5,920,284 A | 7/1999 | Victor | |
| 5,952,958 A | 9/1999 | Speasl et al. | |
| 5,953,311 A | 9/1999 | Davies et al. | |
| 6,006,097 A | 12/1999 | Hornfeldt et al. | |
| 6,016,119 A | 1/2000 | Krasner | |
| 6,078,284 A | 6/2000 | Levanon | |
| 6,107,959 A | 8/2000 | Levanon | |
| 6,131,067 A | 10/2000 | Girerd et al. | |
| 6,137,441 A | 10/2000 | Dai et al. | |
| 6,147,642 A | 11/2000 | Perry et al. | |
| 6,181,921 B1 | 1/2001 | Konisi et al. | |
| 6,184,921 B1 | 2/2001 | Limberg | |
| 6,201,497 B1 | 3/2001 | Snyder et al. | |
| 6,215,778 B1 | 4/2001 | Lomp et al. | |
| 6,289,280 B1 | 9/2001 | Fernandez-Corbaton et al. | |
| 6,317,452 B1 | 11/2001 | Durrant et al. | |
| 6,317,500 B1 | 11/2001 | Murphy | |
| 6,373,432 B1 | 4/2002 | Rabinowitz et al. | |
| 6,374,177 B1 | 4/2002 | Lee et al. | |
| 6,433,740 B1 | 8/2002 | Gilhousen | |
| 6,437,832 B1 | 8/2002 | Grabb et al. | |
| 6,522,297 B1 | 2/2003 | Rabinowitz et al. | |
| 6,559,800 B2 | 5/2003 | Rabinowitz et al. | |
| 6,590,529 B2 | 7/2003 | Schwoegler | |
| 6,646,603 B2 | 11/2003 | Dooley et al. | |
| 6,717,547 B2 | 4/2004 | Spilker, Jr. et al. | |
| 6,727,847 B2 | 4/2004 | Rabinowitz et al. | |
| 6,753,812 B2 | 6/2004 | Rabinowitz et al. | |
| 6,806,830 B2 | 10/2004 | Panasik et al. | |
| 6,809,775 B2 * | 10/2004 | Yule | 348/553 |
| 6,839,024 B2 | 1/2005 | Spilker, Jr. et al. | |
| 6,859,173 B2 | 2/2005 | Spilker, Jr. et al. | |
| 6,861,984 B2 | 3/2005 | Rabinowitz et al. | |
| 6,879,286 B2 | 4/2005 | Rabinowitz et al. | |
| 6,914,560 B2 | 7/2005 | Spilker, Jr. et al. | |
| 6,917,328 B2 | 7/2005 | Rabinowitz et al. | |
| 6,952,182 B2 | 10/2005 | Spilker, Jr. et al. | |
| 6,961,020 B2 | 11/2005 | Robinowitz et al. | |
| 6,963,306 B2 | 11/2005 | Spilker, Jr. et al. | |
| 6,970,132 B2 | 11/2005 | Spilker, Jr. et al. | |
| 7,042,396 B2 | 5/2006 | Omura et al. | |
| 7,042,949 B1 | 5/2006 | Omura et al. | |
| 7,126,536 B2 | 10/2006 | Rabinowitz et al. | |
| 7,372,405 B2 | 5/2008 | Rabinowitz et al. | |
| 2002/0008662 A1 | 1/2002 | Dooley et al. | |
| 2002/0168988 A1 * | 11/2002 | Younis | 455/456 |
| 2002/0184653 A1 | 12/2002 | Pierce et al. | |
| 2003/0122711 A1 | 7/2003 | Panasik et al. | |
| 2003/0156063 A1 | 8/2003 | Spilker et al. | |
| 2004/0073914 A1 | 4/2004 | Spilker et al. | |
| 2004/0201779 A1 | 10/2004 | Spilker et al. | |
| 2005/0066373 A1 | 3/2005 | Rabinowitz | |
| 2005/0251844 A1 | 11/2005 | Martone et al. | |
| 2007/0050824 A1 | 3/2007 | Lee et al. | |
| 2007/0121555 A1 * | 5/2007 | Burgess | 370/335 |
| 2007/0131079 A1 | 6/2007 | Opshaug et al. | |
| 2007/0182633 A1 | 8/2007 | Omura et al. | |
| 2007/0296632 A1 | 12/2007 | Opshaug et al. | |

FOREIGN PATENT DOCUMENTS

| | | |
|---|---|---|
| GB | 2 222 922 A | 3/1990 |
| GB | 2 254 508 A | 10/1992 |

OTHER PUBLICATIONS

Rabinowitz, M., et al., "Positioning Using the ATSC Digital Television Signal," Rosum whitepaper, Online! 2001, XP002235053, Retrieved from the Internet on Mar. 13, 2003 at URL www.rosum.com/whitepaper 8-7-01.pdf.

JP Abstract/ vol. 007, No. 241 (p. 232), Oct. 26, 1983 & JP58 129277 A (Nihon Musen KK) Aug. 2, 1983.

Parkinson, B.W., et al., "Autonomous GPS Integrity Monitoring Using the Pseudorange Residual," *Journal of the Institute of Navigation* (1988), vol. 35, No. 2, pp. 255-274.

Rabinowitz, M., "A Differential Carrier Phase Navigation System Combining GPS with Low Earth Orbit Satellites for Rapid Resolution of Integer Cycle Ambiguities," *PhD Thesis for Department of Electrical Engineering, Stanford University* (Dec. 2000), pp. 59-73.

Spilker, Jr., J.J., "Fundamentals of Signal Tracking Theory," *Global Positioning System: Theory and Applications* (1994), vol. 1, Chapter 7, pp. 245-327.

Van Dierendock, A.J., "GPS Receivers," *Global Positioning System: Theory and Applications* (1995), vol. 1, Chapter 8, pp. 329-407.

U.S. Appl. No. 10/008,613, Pierce, et al.
U.S. Appl. No. 11/380,691, Metzler, et al.
U.S. Appl. No. 11/535,485, Furman, et al.
U.S. Appl. No. 11/622,838, Rabinowitz, et al.
U.S. Appl. No. 11/770,162, Furman, et al.
U.S. Appl. No. 11/865,881, Opshaug, et al.
U.S. Appl. No. 12/117,676, Rabinowitz, et al.
U.S. Appl. No. 12/168,141, Furman, et al.

\* cited by examiner

POSITION LOCATION USING GLOBAL POSITIONING SIGNALS AUGMENTED BY BROADCAST TELEVISION SIGNALS

CROSS-REFERENCE TO RELATED APPLICATIONS

This application is a continuation-in-part of U.S. Nonprovisional patent application Ser. No. 09/887,158, "Position Location using Broadcast Digital Television Signals," by James J. Spilker and Matthew Rabinowitz, filed Jun. 21, 2001 now abandoned, the disclosure thereof incorporated by reference herein in its entirety.

This application claims the benefit of U.S. Provisional Patent Application Ser. No. 60/361,762, "DTV Position Location Augmented by GPS," by James J. Spilker, filed Mar. 4, 2002; U.S. Provisional Patent Application Ser. No. 60/353,440, "DTV Position Location Augmented by GPS," by James J. Spilker, filed Feb. 1, 2002; and U.S. Provisional Patent Application Ser. No. 60/332,504, "DTV Augmented GPS for Robust Aircraft Navigation," filed Nov. 13, 2001, the disclosures thereof incorporated by reference herein in their entirety.

BACKGROUND

The present invention relates generally to position determination, and particularly to position determination using global positioning signals augmented by broadcast television signals.

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C. 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

There has even been a proposed system using conventional analog National Television System Committee (NTSC) television signals to determine position. This proposal is found in a U.S. Patent entitled "Location Determination System And Method Using Television Broadcast Signals," U.S. Pat. No. 5,510,801, issued Apr. 23, 1996. However, the present analog TV signal contains horizontal and vertical synchronization pulses intended for relatively crude synchronization of the TV set sweep circuitry. Further, in 2006 the Federal Communication Commission (FCC) will consider turning off NTSC transmitters and reassigning that valuable spectrum so that it can be auctioned for other purposes deemed more valuable.

SUMMARY

In general, in one aspect, the invention features a method, apparatus, and computer-readable media for determining the position of a user terminal. It comprises receiving at the user terminal a broadcast television signal from a television signal transmitter; determining a first pseudo-range between the user terminal and the television signal transmitter based on a known component of the broadcast television signal; receiving at the user terminal a global positioning signal from a global positioning satellite; determining a second pseudo-range between the user terminal and the global positioning satellite based on the global positioning signal; and determining a position of the user terminal based on the first and second pseudo-ranges, a location of the television signal transmitter, and a location of the global positioning satellite.

Particular implementations can include one or more of the following features. Determining a position of the user terminal comprises adjusting the first pseudo-range based on a difference between a transmitter clock at the broadcast television signal and a known time reference; adjusting the second pseudo-range based on a relative radial velocity between the global positioning satellite and the user terminal; and determining the position of the user terminal based on the adjusted first and second pseudo-ranges, a location of the television signal transmitter, and a location of the global positioning satellite. The broadcast television signal is an American Television Standards Committee (ATSC) digital television signal, and the known component in the broadcast television signal is a known digital sequence in the ATSC frame. The known digital sequence is a synchronization code. The synchronization code is a Field Synchronization Segment within an ATSC data frame. The synchronization code is a Synchronization Segment within a Data Segment within an ATSC data frame. The broadcast television signal is a European Telecommunications Standards Institute (ETSI) Digital Video Broadcasting-Terrestrial (DVB-T) signal. The known component in the broadcast television signal is a scattered pilot carrier. The broadcast television signal is a Japanese Integrated Services Digital Broadcasting-Terrestrial (ISDB-T) signal. The broadcast television signal is an analog television signal. The known component in the broadcast television signal is selected from the group comprising a horizontal synchronization pulse; a horizontal blanking pulse; a horizontal blanking pulse and a horizontal synchronization pulse; a ghost canceling reference signal; and a vertical interval test signal.

In general, in one aspect, the invention features a method, apparatus, and computer-readable media for determining the position of a user terminal. It comprises receiving at the user terminal a broadcast television signal from a television signal transmitter; determining a first pseudo-range between the user terminal and the television signal transmitter based on a known component of the broadcast television signal; receiving at the user terminal a global positioning signal from a global positioning satellite; determining a second pseudo-range between the user terminal and the global positioning satellite based on the global positioning signal; and transmitting the first and second pseudoranges to a location server configured to determine a position of the user terminal based on the first and second pseudo-ranges, a location of the television signal transmitter, and a location of the global positioning satellite.

Particular implementations can include one or more of the following features. The broadcast television signal is an American Television Standards Committee (ATSC) digital television signal, and the known component in the broadcast television signal is a known digital sequence in the ATSC frame. The known digital sequence is a synchronization code. The synchronization code is a Field Synchronization Segment within an ATSC data frame. The synchronization code is a Synchronization Segment within a Data Segment within an ATSC data frame. The broadcast television signal is a European Telecommunications Standards Institute (ETSI) Digital Video Broadcasting-Terrestrial (DVB-T) signal. The known component in the broadcast television signal is a scattered pilot carrier. The broadcast television signal is a Japanese Integrated Services Digital Broadcasting-Terrestrial (ISDB-T) signal. The broadcast television signal is an analog television signal. The known component in the broadcast television signal is selected from the group comprising a horizontal synchronization pulse; a horizontal blanking pulse; a horizontal blanking pulse and a horizontal synchronization pulse; a ghost canceling reference signal; and a vertical interval test signal.

In general, in one aspect, the invention features a method, apparatus, and computer-readable media for determining the position of a user terminal. It comprises receiving a first pseudo-range from the user terminal, the first pseudo-range determined between the user terminal and the television signal transmitter based on a known component of a broadcast television signal transmitted by the television signal transmitter; receiving a second pseudo-range from the user terminal, the second pseudo-range determined between the user terminal and a global positioning satellite based on a global positioning signal transmitted by the global positioning signal; and determining a position of the user terminal based on the first and second pseudo-ranges, a location of the television signal transmitter, and a location of the global positioning satellite.

Particular implementations can include one or more of the following features. Determining a position of the user terminal comprises adjusting the first pseudo-range based on a difference between a transmitter clock at the broadcast television signal and a known time reference; adjusting the second pseudo-range based on a relative radial velocity between the global positioning satellite and the user terminal; and determining the position of the user terminal based on the adjusted first and second pseudo-ranges, a location of the television signal transmitter, and a location of the global positioning satellite. The broadcast television signal is an American Television Standards Committee (ATSC) digital television signal, and the known component in the broadcast television signal is a known digital sequence in the ATSC frame. The known digital sequence is a synchronization code. The synchronization code is a Field Synchronization Segment within an ATSC data frame. The synchronization code is a Synchronization Segment within a Data Segment within an ATSC data frame. The broadcast television signal is a European Telecommunications Standards Institute (ETSI) Digital Video Broadcasting-Terrestrial (DVB-T) signal. The known component in the broadcast television signal is a scattered pilot carrier. The broadcast television signal is a Japanese Integrated Services Digital Broadcasting-Terrestrial (ISDB-T) signal. The broadcast television signal is an analog television signal. The known component in the broadcast television signal is selected from the group comprising a horizontal synchronization pulse; a horizontal blanking pulse; a horizontal blanking pulse and a horizontal synchronization pulse; a ghost canceling reference signal; and a vertical interval test signal.

The details of one or more implementations are set forth in the accompanying drawings and the description below. Other features will be apparent from the description and drawings, and from the claims.

Figure 1:
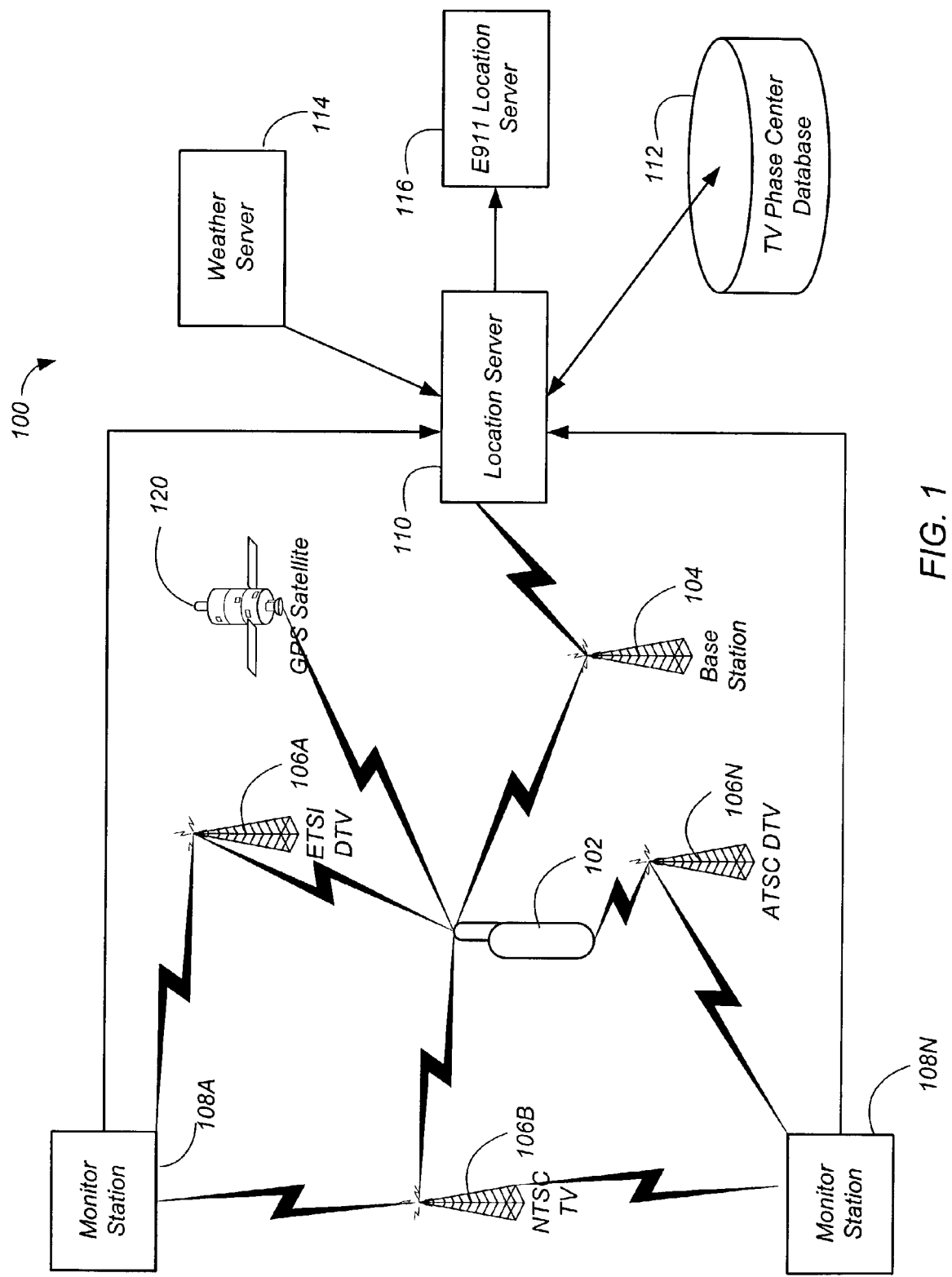
FIG. 1 depicts an implementation of the present invention including a user terminal that communicates over an air link with a base station.

The leading digit(s) of each reference numeral used in this specification indicates the number of the drawing in which the reference numeral first appears.

DETAILED DESCRIPTION

Introduction

Broadcast television signals can be used to determine the position of a user terminal. Techniques for determining the position of a user terminal using the American Television Standards Committee (ATSC) digital television (DTV) signal are disclosed in commonly-owned copending U.S. Non-provisional patent application Ser. No. 09/887,158, "Position Location using Broadcast Digital Television Signals," by James J. Spilker and Matthew Rabinowitz, filed Jun. 21, 2001, the disclosure thereof incorporated by reference herein in its entirety. Techniques for determining the position of a user terminal using the European Telecommunications Standards Institute (ETSI) Digital Video Broadcasting-Terrestrial (DVB-T) signal are disclosed in commonly-owned copending U.S. Provisional Patent Application Ser. No. 60/337,834, "Wireless Position Location Using the Japanese ISDB-T Digital TV Signals," by James J. Spilker, filed Nov. 9, 2001, the disclosure thereof incorporated by reference herein in its entirety. Techniques for determining the position of a user terminal using the Japanese Integrated Services Digital Broadcasting-Terrestrial (ISDB-T) signal are disclosed in commonly-owned copending U.S. Non-provisional patent application Ser. No. 09/932,010, "Position Location using Terrestrial Digital Video Broadcast Television Signals," by James J. Spilker and Matthew Rabinowitz, filed Aug. 17, 2001, the disclosure thereof incorporated by reference herein in its entirety. Techniques for determining the position of a user terminal using the NTSC (National Television System Committee) analog television (TV) signal are disclosed in commonly-owned copending U.S. Non-provisional patent applications Ser. No. 10/054,302, "Position Location using Broadcast Analog Television Signals," by James J. Spilker and Matthew Rabinowitz, filed Jan. 22, 2002, and Ser. No. 10/159,831, "Position Location Using Ghost Canceling Reference Television Signals," by James J. Spilker and Matthew Rabinowitz, filed (TBS), the disclosures thereof incorporated by reference herein in their entirety.

Each of these television signals includes components that can be used to obtain a pseudo-range to the transmitter of the television signal. When multiple such pseudo-ranges are known, and the locations of the transmitters are known, the position of the user terminal can be determined with accuracy.

Suitable components within the ATSC digital television signal include synchronization codes such as the Field Synchronization Segment within an ATSC data frame and the Synchronization Segment within a Data Segment within an ATSC data frame. Suitable components within the ETSI DVB-T and ISDB-T digital television signals include scattered pilot carriers. Suitable components within the NTSC analog television signal include the horizontal synchronization pulse, the horizontal blanking pulse, the horizontal blanking pulse and horizontal synchronization pulse taken together, the ghost canceling reference signal; and the vertical interval test signal.

In most urban regions there are a sufficient number of TV signals broadcast from different locations to permit a user terminal to measure pseudo-ranges from 3 or more different angles to determine the position of the user terminal. However in some regions hills, buildings, other obstructions, or even the body of a user may block one of the TV signals. Alternatively, the user terminal may simply be located in a rural region too distant from the required number of TV transmitters. In such cases the remaining pseudo-ranges can be supplied using a standard global positioning system (GPS) receiver. Techniques for augmenting position location using broadcast television signals with GPS signals are disclosed in U.S. Provisional Patent Application Ser. No. 60/361,762, "DTV Position Location Augmented by GPS," by James J. Spilker, filed Mar. 4, 2002, the disclosure thereof incorporated by reference herein in its entirety. A user terminal using these techniques can determine its position using 3 or more broadcast television signals, 3 or more GPS signals, or any combination thereof.

Referring to FIG. 1, an example implementation 100 includes a user terminal 102 that communicates over an air link with a base station 104. In some implementations, user terminal 102 is a wireless telephone and base station 104 is a wireless telephone base station. In some implementations, base station 104 is part of a mobile MAN (metropolitan area network) or WAN (wide area network).

FIG. 1 is used to illustrate various aspects of the invention but the invention is not limited to this implementation. For example, the phrase "user terminal" is meant to refer to any object capable of implementing the position location techniques described herein. Examples of user terminals include PDAs, mobile phones, cars and other vehicles, and any object which could include a chip or software implementing the position location techniques described herein. Further, the term "user terminal" is not intended to be limited to objects which are "terminals" or which are operated by "users."

Position Location Performed by a Location Server

Figure 2:
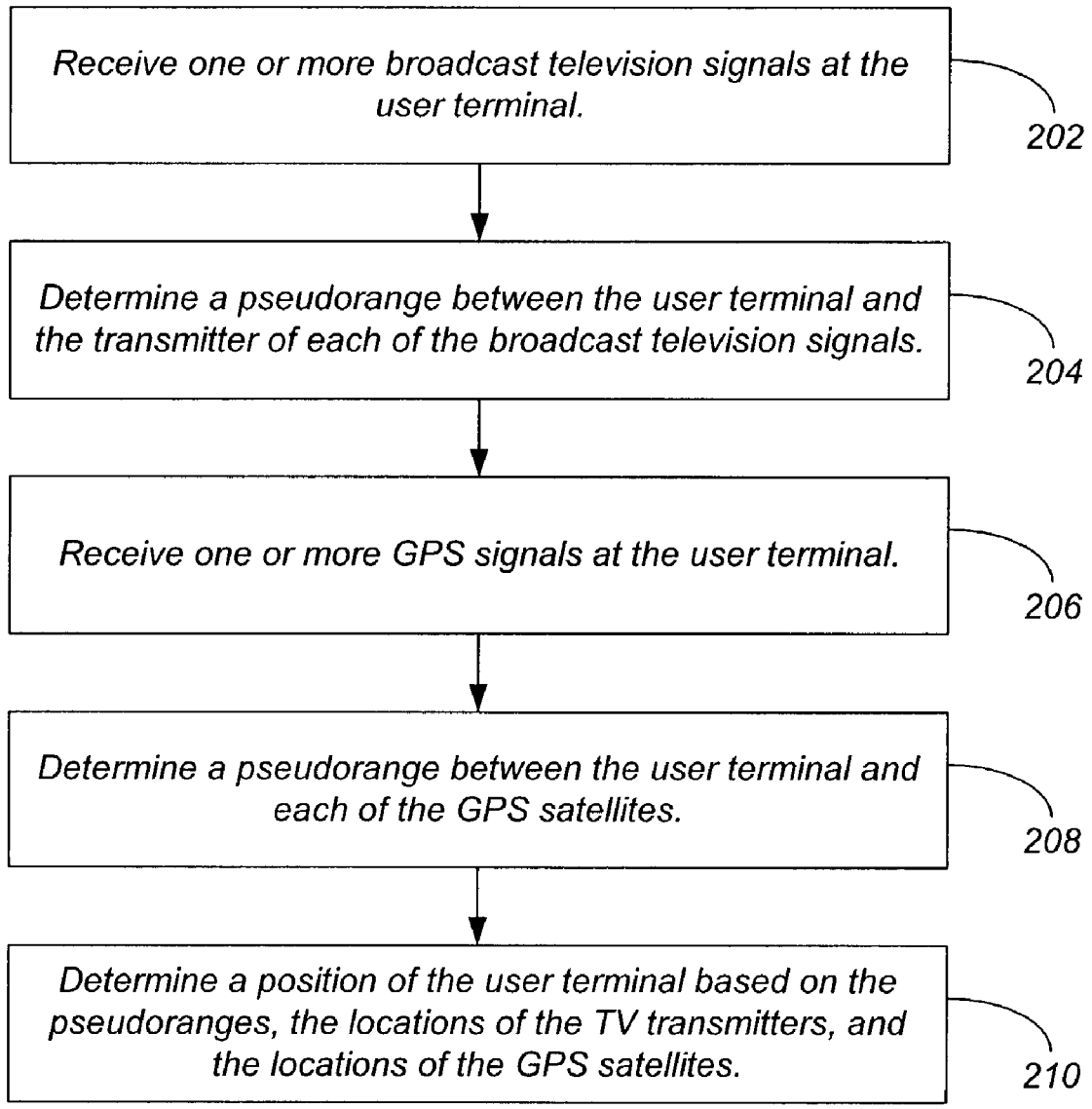
FIG. 2 illustrates an operation of an implementation of the invention.

FIG. 2 illustrates an operation of implementation 100. User terminal 102 receives broadcast signals from one or more TV transmitters 106A and 106B through 106N (step 202). Referring to FIG. 1, TV transmitter 106A is a ETSI transmitter, TV transmitter 106B is a NTSC transmitter, and TV transmitter 106N is a ATSC transmitter, although other combinations are contemplated, including transmitters of the ISDB signal used in Japan.

Various methods can be used to select which TV channels to use in position location. In one implementation, a location server 110 tells user terminal 102 of the best TV channels to monitor. In some implementations, user terminal 102 exchanges messages with location server 110 by way of base station 104. In some implementations user terminal 102 selects TV channels to monitor based on the identity of base station 104 and a stored table correlating base stations and TV channels. In some implementations, user terminal 102 can accept a location input from the user that gives a general indication of the location of the user terminal, such as the name of the nearest city; and uses this information to select TV channels for processing. In some implementations, user terminal 102 scans available TV channels to assemble a fingerprint of the location based on power levels of the available TV channels. User terminal 102 compares this fingerprint to a stored table that matches known fingerprints with known locations to select TV channels for processing.

User terminal 102 determines a pseudo-range between the user terminal and each TV transmitter 106 (step 204). Each pseudo-range represents the time difference (or equivalent distance) between a time of transmission from a transmitter 108 of a component of the TV broadcast signal and a time of reception at the user terminal 102 of the component, as well as a clock offset at the user terminal.

User terminal 102 transmits the pseudo-ranges to location server 110. In some implementations, location server 110 is implemented as a general-purpose computer executing software designed to perform the operations described herein. In another implementation, location server is implemented as an ASIC (application-specific integrated circuit), or some other sort of device. In some implementations, location server 110 is implemented within or near base station 104.

The TV signals are also received by a plurality of monitor units 108A through 108N. Each monitor unit 108 can be implemented as a small unit including a transceiver and processor, and can be mounted in a convenient location such as on a utility pole, TV transmitter 106, or base station 104. In some implementations, monitor units 108 are implemented on satellites.

Each monitor unit 108 measures, for each of the TV transmitters 106 from which it receives TV signals, a time offset between the local clock of that TV transmitter and a reference clock. In some implementations the reference clock is derived from GPS signals. The use of a reference clock permits the determination of the time offset for each TV transmitter 106 when multiple monitor units 108 are used, since each monitor unit 108 can determine the time offset with respect to the reference clock. Thus, offsets in the local clocks of the monitor units 108 do not affect these determinations. Monitor units 108 are described in detail in U.S. Ser. Nos. 09/887,158, 09/932,010, and 10/054,302, the disclosures thereof incorporated by reference herein in their entirety.

In another implementation, no external time reference is needed. According to this implementation, a single monitor unit 108 receives TV signals from all of the same TV transmitters as does user terminal 102. In effect, the local clock of the single monitor unit functions as the time reference.

In some implementations, each time offset is modeled as a fixed offset. In another implementation each time offset is modeled as a second order polynomial fit of the form $$\text{Offset}=a+b(t-T)+c(t-T)^2 \tag{1}$$

that can be described by a, b, c, and T. In either implementation, each measured time offset is transmitted periodically to the location server using the Internet, a secured modem connection or the like. In some implementations, the location of each monitor unit 108 is determined using GPS receivers.

Location server 110 receives information describing the phase center (i.e., the location) of each TV transmitter 106 from a database 112. In some implementations, the phase center of each TV transmitter 106 is measured by using monitor units 108 at different locations to measure the phase center directly. In another implementation, the phase center of each TV transmitter 106 is measured by surveying the antenna phase center.

In some implementations, location server 110 receives weather information describing the air temperature, atmospheric pressure, and humidity in the vicinity of user terminal 102 from a weather server 114. The weather information is available from the Internet and other sources such as NOAA. Location server 110 determines tropospheric propagation velocity from the weather information using techniques such as those disclosed in B. Parkinson and J. Spilker, Jr. Global Positioning System-Theory and Applications, AIAA, Washington, D.C., 1996, Vol. 1, Chapter 17 Tropospheric Effects on GPS by J. Spilker, Jr.

Location server 110 can also receive from base station 104 information which identifies a general geographic location of user terminal 102. For example, the information can identify a cell or cell sector within which a cellular telephone is located. This information is used for ambiguity resolution.

User terminal 102 receives GPS signals from one or more GPS satellites 120 (step 206). User terminal 102 also receives almanac data describing Doppler shifts and pseudo-noise numbers for GPS satellites 120, as described below. User terminal 102 determines a pseudo-range between the user terminal and each GPS satellite 120 using the relative radial velocities represented by the Doppler shifts (step 208). Each pseudo-range represents the time difference (or equivalent distance) between a time of transmission from a GPS satellite 120 of a component of the GPS signal and a time of reception at the user terminal 102 of the component, as well as a clock offset at the GPS satellite. User terminal 102 transmits the pseudo-ranges to location server 110.

Figure 3:
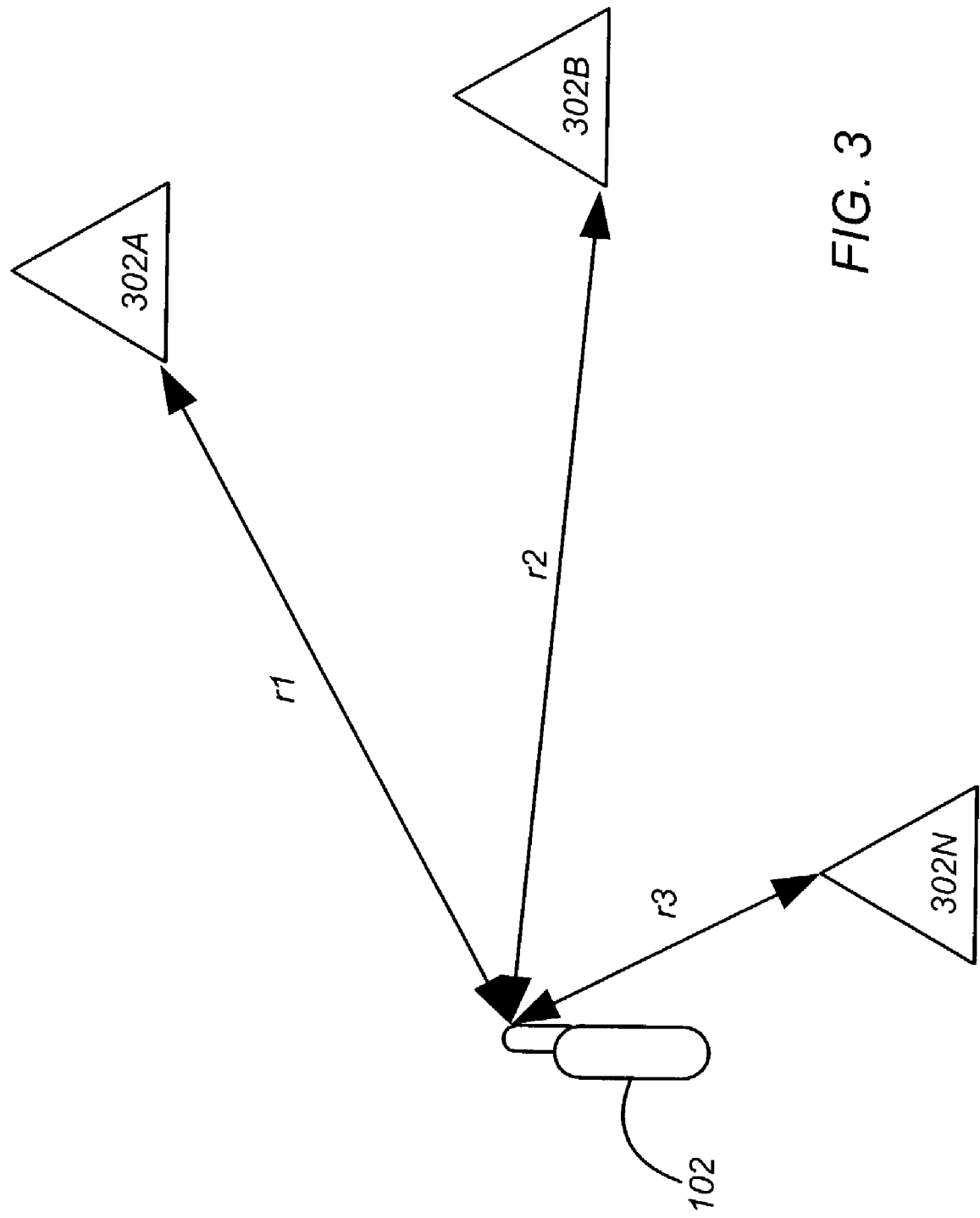
FIG. 3 depicts the geometry of a position determination using 3 DTV transmitters.

Location server 110 determines a position of the user terminal based on the pseudo-ranges, a location of each of the TV transmitters 106, and a location of the GPS satellites 120 (step 210). FIG. 3 depicts the geometry of a position determination using three transmitters 302. Transmitters 302 can be all TV transmitters, all GPS transmitters, or any combination thereof. Transmitter 302A is located at position (x1, y1, z1). The range between user terminal 102 and transmitter 302A is r1. Transmitter 302B is located at position (x2, y2, z2). The range between user terminal 102 and transmitter 302B is r2. Transmitter 302N is located at position (x3, y3, z3). The range between user terminal 102 and transmitter 302N is r3.

Location server 110 may adjust the value of each pseudo-range according to the tropospheric propagation velocity and the time offset for the corresponding transmitter 302. Location server 110 uses the phase center information from database 112 to determine the position of each transmitter 302.

User terminal 102 makes three or more pseudo-range measurements to solve for three unknowns, namely the position (x, y) and clock offset T of user terminal 102. It is assumed that the altitude of the user terminal is known to within the necessary degree of accuracy and only the latitude and longitude of the user terminal need to be precisely determined. Of course, it is possible to solve for position of the user terminal in three dimensions, namely (x, y, z) assuming that four or more transmitters are available, and the geometry of those transmitters is sufficient. It would be clear to one skilled in the art how to adjust the techniques described herein for a 3-Dimensional position fix.

The three pseudo-range measurements pr1, pr2 and pr3 are given by $$pr1 = r1 + T \quad (2)$$

$$pr2 = r2 + T \quad (3)$$

$$pr3 = r3 + T \quad (4)$$

The three ranges can be expressed as $$r1 = |X - X1| \quad (5)$$

$$r2 = |X - X2| \quad (6)$$

$$r3 = |X - X3| \quad (7)$$

where X represents the three-dimensional vector position (x, y, z) of user terminal, X1 represents the three-dimensional vector position (x1, y1, z1) of transmitter 302A, X2 represents the three-dimensional vector position (x2, y2, z2) of transmitter 302B, and X3 represents the three-dimensional vector position (x3, y3, z3) of transmitter 302N. These relationships produce three equations in which to solve for the three unknowns x, y, and T. Notice that in the case that only latitude and longitude are required, location server 110 assumes some estimate for z and does not solve for it as for the other unknown co-ordinates. In one implementation, using a terrain map, the initial estimate of z can be iteratively refined based on the computed values for x and y. In another implementation, location server 110 actively solves for z. Location server 110 solves these equations according to conventional well-known methods. In an E911 application, the position of user terminal 102 is transmitted to E911 location server 116 for distribution to the proper authorities. In another application, the position is transmitted to user terminal 102.

In some implementations, user terminal 102 does not compute pseudo-ranges, but rather takes measurements of the signals that are sufficient to compute pseudo-range, and transmits these measurements to location server 110. Location server 110 then computes the pseudo-ranges based on the measurements, and computes the position based on the pseudo-ranges, as described above.

Position Location Performed by User Terminal

In some implementations, the position of user terminal 102 is computed by user terminal 102. In this implementation, all of the necessary information is transmitted to user terminal 102. This information can be transmitted to user terminal by location server 110, base station 104, one or more TV transmitters 106, GPS satellites 120, or any combination thereof. User terminal 102 then measures the pseudo-ranges and solves the simultaneous equations as described above. This implementation is now described.

User terminal 102 receives the time offset between the local clock of each TV transmitter 106 and a reference clock. User terminal 102 also receives information describing the phase center of each TV transmitter 106 from a database 112.

User terminal 102 receives the tropospheric propagation velocity computed by location server 110. In some implementation, user terminal 102 receives weather information describing the air temperature, atmospheric pressure, and humidity in the vicinity of user terminal 102 from a weather server 114, and determines tropospheric propagation velocity from the weather information using conventional techniques.

User terminal 102 can also receive from base station 104 information which identifies the rough location of user terminal 102. For example, the information can identify a cell or cell sector within which a cellular telephone is located. This information is used for ambiguity resolution.

User terminal 102 receives TV signals from one or more TV transmitters 106 and determines a pseudo-range between the user terminal 102 and each TV transmitter 106. User terminal 102 receives GPS signals from one or more GPS satellites 120 and almanac data describing Doppler shifts and pseudo-noise numbers for the GPS satellites, as described below, and determines pseudo-ranges between the user terminal 102 and the GPS satellites 120 using the relative radial velocities represented by the Doppler shifts. User terminal 102 then determines its position based on the pseudo-ranges, the locations of the TV transmitters 106, and the locations of the GPS satellites 120.

In any of these implementations, the position of user terminal 102 can be determined using a TV transmitter and the offset T computed during a previous position determination for that TV transmitter. The values of T can be stored or maintained according to conventional methods.

In some implementations, base station 104 determines the clock offset of user terminal 102. In this implementation, only two transmitters are required for position determination. Base station 104 transmits the clock offset T to location server 110, which then determines the position of user terminal 102 from the pseudo-range computed for each of the transmitters.

Receiver Architecture

The signal processing for both TV and GPS signals can be performed either using correlation of short samples of the received digitized signals or by using a delay-lock loop or time-gated delay lock loop. Such delay lock loop techniques are disclosed in commonly-owned copending U.S. Non-provisional patent application Ser. No. 10/054,262, "Time-Gated Delay Lock Loop Tracking Of Digital Television Signals," by James J. Spilker and Matthew Rabinowitz, filed Jan. 22, 2002, the disclosure thereof incorporated by reference herein in its entirety.

Figure 4:
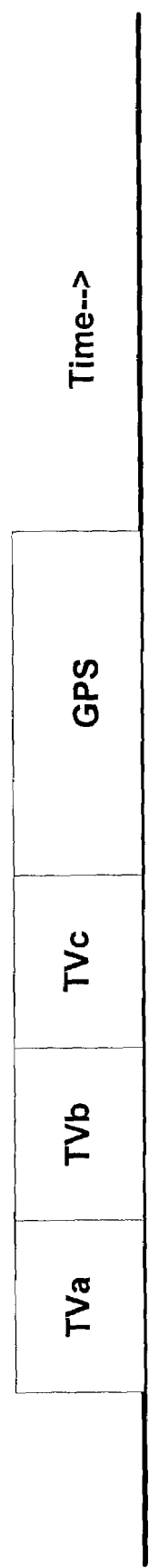
FIG. 4 shows a time switching sequence for an integrated TV/GPS receiver according to some implementations.

FIG. 4 shows a time switching sequence for an integrated TV/GPS receiver according to some implementations. The receiver time sequences over the various signal sources changing the TV channel frequencies to examine three TV signals (TVa, TVb, and TVc) in this example and then switching to the GPS band to examine one or more GPS signals. Of course when tuned to the GPS band, the receiver can correlate any of the GPS satellites and multiple GPS satellites concurrently.

Figure 5:
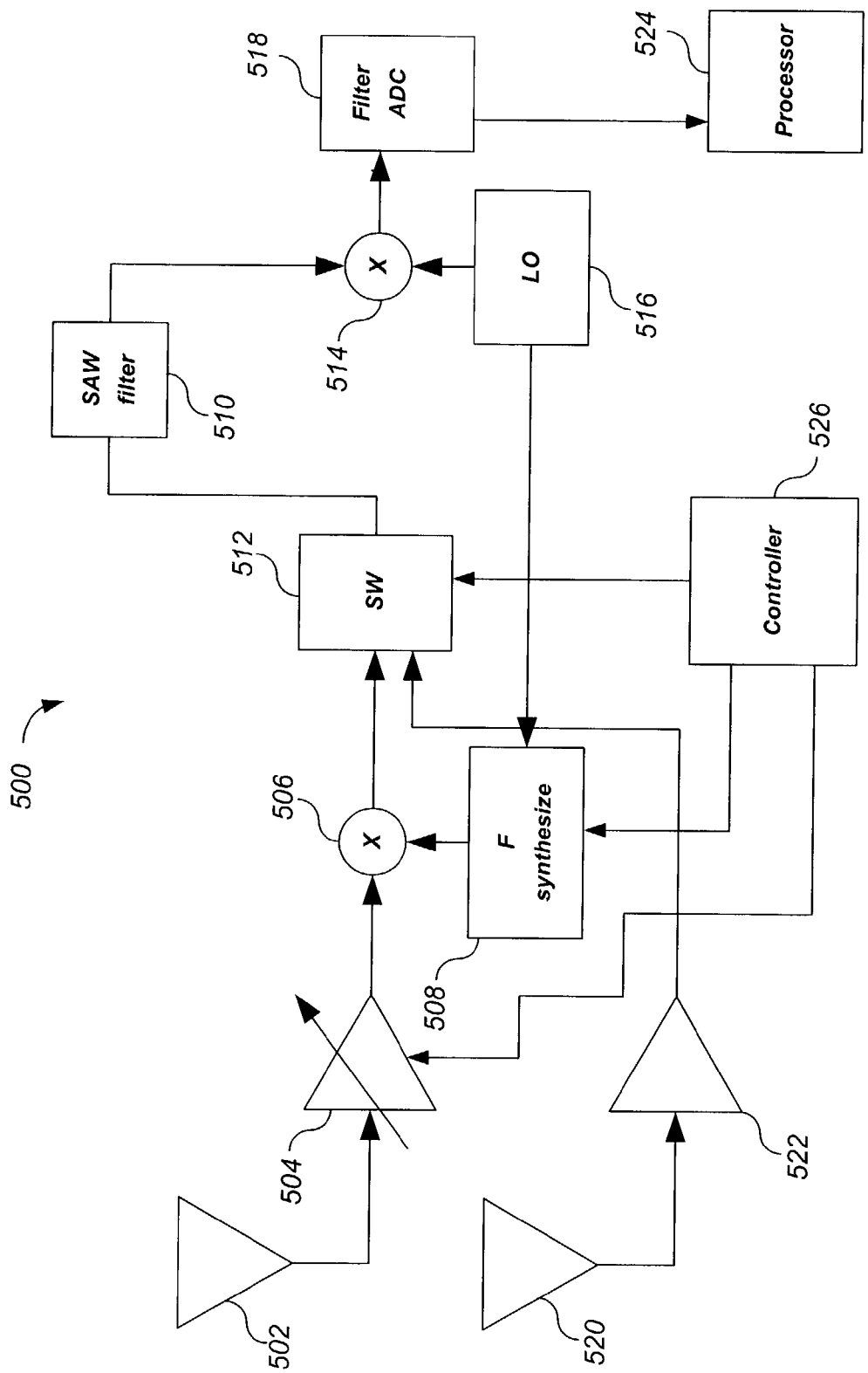
FIG. 5 shows a receiver capable of processing both television signals and GPS signals for position determination according to some implementations.

FIG. 5 shows a receiver 500 capable of processing both television signals and GPS signals for position determination according to some implementations. A TV antenna 502 receives the TV signals. In other implementations, the same antenna can be used for both the GPS and the TV signal. This antenna can be coupled to a tuning circuit in order to resonate at the different frequencies. Alternately, this antenna can have two feeds, one which outputs a signal in the GPS band and one which outputs a signal in the TV band, with a switch determining which feed outputs to the LNA in the receiver front end. A low noise amplifier and RF filter 504 amplifies and filters the received TV signals. The RF filter is tunable over the range of at least 450 MHz to 700 MHz, or the band for whatever set of TV signals is selected. The low noise amplifier includes an automatic gain control function. A mixer 506 combines the resulting signal with the output of a frequency synthesizer 508 to up-convert the signal to an IF frequency where a narrow bandwidth SAW filter 510 can be employed. A switch 512 passes the TV signal to SAW filter 510. In order to make use of GPS the IF frequency is the GPS L1 frequency of 1575.42 MHz. Other implementations use the L2 frequency of 1227.6 MHz, which will shortly have a new civil signal, or the new L5 signal in the 1.1 GHz region. In other implementations, a different IF frequency can be used and the GPS signal as well as the TV signal will initially be up-converted or down-converted before bandpass filtering.

A mixer 514 combines the filtered signal with the output of a local oscillator 516 to down-convert the filtered signal to a convenient IF or baseband frequency. In some implementations the IF frequency is 44 MHz, a standard TV IF frequency. Filter/ADC 518 then filters and digitizes the signal. The signal can then be IF sampled at, for example, 27 Msps using a 10 bit ADC. The digitized signal is fed to a processor 524 for processing. A controller 526 controls filter/amplifier 504, frequency synthesizer 508, and switch 512.

A GPS antenna 520, such as a patch antenna, receives the GPS signals. A low noise amplifier and RF filter 522 amplifies and filters the received GPS signals. Switch 512 passes the GPS signal to SAW filter 510. Mixer 514 combines the filtered signal with the output of a local oscillator 516 to down-convert the filtered signal to a convenient IF or baseband frequency. Filter/ADC 518 then filters and digitizes the signal. The signal can then be IF sampled at, for example, 27 Msps using a 10 bit ADC. The digitized signal is fed to processor 524 for processing.

In some implementations, the entire RF section is fabricated as a single integrated circuit, with the exception of the SAW or similar high selectivity bandpass filter, and processor 524 is fabricated as a separate integrated circuit.

GPS Receiver Aiding in a Hybrid TV/GPS Handset

Because GPS satellites 120 move rapidly in their orbits, their signals are subject to large Doppler shifts caused by the large relative radial velocities between the GPS satellites and the stationary or slowly moving user terminals 102. These Doppler shifts can range over +/−5.5 kHz. In addition each GPS satellite 120 has a different pseudo-noise (PN) code. Thus in order to obtain accurate pseudo-range measurements with GPS signals, it is necessary to determine the Doppler shifts of the GPS satellites 120 and the PN codes.

GPS satellites 120 transmit an almanac which gives approximate satellite orbits and velocities as well as clock offsets and other factors for up to 32 GPS satellites. The entire almanac of information for 32 satellites comprises only 1 KB of information. With this information and knowledge of very crude position information and user terminal clock time, user terminal 102 can estimate the Doppler information for the GPS satellites 120 in view, and their corresponding PN codes, quite easily to much greater precision than needed for initial acquisition by a noncoherent delay lock tracking loop for GPS.

In fact a larger frequency uncertainty is caused by the handset local oscillator which may have a stability of only 5 parts per million. This frequency uncertainty by itself contributes a frequency error of approximately +/−7.9 kHz unless corrected. Corrections to the user terminal clock can be obtained by either tracking the TV pilot carrier or by correction using the cell phone signals.

In some implementations location server 110 periodically downloads to the user terminal the GPS almanac data via a cell phone data link.

In some implementations user terminal 102 computes GPS satellite Doppler from GPS satellite almanac data. Based on its approximate position (within 100 km or so), user terminal 102 can determine which GPS satellites 120 are visible at any given time. Monitor stations 108 collect the almanac data for all GPS satellites, and transfer them to user terminal 102. User terminal 102 then determines satellite visibility and Doppler. The GPS system updates the almanac data about once a week. The GPS satellite Doppler ranges from −5,500 to +5,500 Hz (at 1.575420 GHz). A typical GPS receiver only needs Doppler to within 500 Hz. Provided with good user terminal position and time estimates, user terminal 102 can compute Doppler to within 1 Hz with almanac data that is a week old. Therefore, assuming that the monitor stations 108 always have the latest almanac data, monitor stations 108 need to upload fresh almanac data to user terminals 102 only once a week.

Although the official GPS constellation consists of 24 satellites, in reality there can be up to 28 satellites. Each GPS satellite 120 has a satellite ID called the satellite PN (pseudonoise) number, which ranges from 1 through 32. The number of bits for one set of data is:

Satellite ID=6 bits (to account for PRN 1-32)
Almanac=182 bits
Total=188 bits.

The entire set of almanac data for 28 satellites needs 28×188=5,264 bits per week.

The GPS standard already provides means of moving this type of information to a user terminal 102. GPS "assistance data" can be delivered in two ways: short message cell broadcast (SMCB) and radio resource location protocol (RRLP) messages in the control channels. SMCB can be used for almanac, ephemeris, ionospheric, and DGPS correction data. The contents of these messages are described in GSM spec 04.35, section 4.2. These messages might be available to battery pack accessories on some user terminals, since the protocol is based on a form of SMS.

RRLP messages can carry everything a SMCB message can carry, but can also carry "acquisition assistance" information, which includes code offsets and Doppler data. These messages are described in GSM spec 04.31, annex A.4.2.4. These messages would generally not be available to a battery pack accessory.

In other implementations, monitor stations 108 upload satellite Doppler to user terminals 102. In this option, monitor stations 108 keep the almanac data and compute GPS satellite visibility and Doppler estimates. In some implementations, monitor stations 108 use their own location (instead of the user terminal location, which neither the monitor station nor the user terminal knows at the time) in the estimation. One Hertz resolution of the Doppler is adequate (considering the uncertainty due to the local oscillator in the user terminal). Furthermore, the maximum numbers of Doppler sets is the number of visible satellites, not the number of satellites in constellation. The number of bits required for every contact is:

Satellite ID=6 bits (to account for PRN 1-32)
Doppler=14 bits (to account for +/−5,500 Hz in 1-Hz resolution)
Total=20 bits.

Assuming a maximum of 12 visible satellites; 12*20=240 bits per contact.

Alternate Embodiments

The invention can be implemented in digital electronic circuitry, or in computer hardware, firmware, software, or in combinations thereof. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

In contrast with systems that utilize heavily augmented GPS receivers, which must attempt to track an extremely low level GPS signal in urban indoor areas, some implementations of the present invention use the various TV signals to determine position in urban areas and utilize the GPS signals only in more remote areas or in hilly or mountainous regions where the TV signals are almost completely blocked. In those regions, GPS does not generally suffer the severe building attenuation, and serves a very useful function. Thus relatively simple and low cost GPS receivers suffice.

A number of embodiments of the invention have been described. Nevertheless, it will be understood that various modifications may be made without departing from the spirit and scope of the invention.

For example, while various signals and signal processing techniques are discussed herein in analog form, digital implementations will be apparent to one skilled in the relevant art after reading this description.

In some implementations, Location server 110 employs redundant signals available at the system level, such as pseudo-ranges available from the TV transmitters, making additional checks to validate each TV channel and pseudo-range, and to identify TV channels that are erroneous. One such technique is conventional receiver autonomous integrity monitoring (RAIM).

Accordingly, other embodiments are within the scope of the following claims.

What is claimed is:

1. A method for determining the position of a user terminal, comprising:

receiving at the user terminal a broadcast television signal from a television signal transmitter;

determining a first pseudo-range between the user terminal and the television signal transmitter based on a known component of the broadcast television signal;

receiving at the user terminal a global positioning signal from a global positioning satellite; and determining a second pseudo-range between the user terminal and the global positioning satellite based on the global positioning signal; and wherein a position of the user terminal is determined based on the first and second pseudo-ranges, a location of the television signal transmitter, and a location of the global positioning satellite.

2. The method of claim 1, further comprising:

determining a position of the user terminal based on the first and second pseudo-ranges, a location of the television signal transmitter, and a location of the global positioning satellite.

3. The method of claim 1, wherein determining a position of the user terminal comprises:

adjusting the first pseudo-range based on a difference between a transmitter clock at the television signal transmitter and a known time reference;

adjusting the second pseudo-range based on a relative radial velocity between the global positioning satellite and the user terminal; and determining the position of the user terminal based on the adjusted first and second pseudo-ranges, a location of the television signal transmitter, and a location of the global positioning satellite.

4. A method for determining the position of a user terminal, comprising:

receiving a first pseudo-range from the user terminal, the first pseudo-range determined between the user terminal and a television signal transmitter based on a known component of a broadcast television signal transmitted by the television signal transmitter;

receiving a second pseudo-range from the user terminal, the second pseudo-range determined between the user terminal and a global positioning satellite based on a global positioning signal transmitted by the global positioning satellite; and determining a position of the user terminal based on the first and second pseudo-ranges, a location of the television signal transmitter, and a location of the global positioning satellite.

5. The method of claim 4, wherein determining a position of the user terminal comprises:

adjusting the first pseudo-range based on a difference between a transmitter clock at the television signal transmitter and a known time reference;

adjusting the second pseudo-range based on a relative radial velocity between the global positioning satellite and the user terminal; and determining the position of the user terminal based on the adjusted first and second pseudo-ranges, a location of the television signal transmitter, and a location of the global positioning satellite.

6. Computer-readable media embodying instructions executable by a computer to perform a method for determining the position of a user terminal, the method comprising:

determining a first pseudo-range between the user terminal and a television signal transmitter based on a known component of a broadcast television signal received at the user terminal from the television signal transmitter; and determining a second pseudo-range between the user terminal and a global positioning satellite based on a global positioning signal received at the user terminal from the global positioning satellite; and wherein a position of the user terminal is determined based on the first and second pseudo-ranges, a location of the television signal transmitter, and a location of the global positioning satellite.

7. The media of claim 6, wherein the method further comprises:

determining the position of the user terminal based on the first and second pseudo-ranges, the location of the television signal transmitter, and the location of the global positioning satellite.

8. The media of claim 7, wherein determining a position of the user terminal comprises:

adjusting the first pseudo-range based on a difference between a transmitter clock at the television signal transmitter and a known time reference;

adjusting the second pseudo-range based on a relative radial velocity between the global positioning satellite and the user terminal; and determining the position of the user terminal based on the adjusted first and second pseudo-ranges, a location of the television signal transmitter, and a location of the global positioning satellite.

9. Computer-readable media embodying instructions executable by a computer to perform a method for determining the position of a user terminal, the method comprising:

receiving a first pseudo-range, the first pseudo-range determined between the user terminal and the television signal transmitter based on a known component of a broadcast television signal transmitted by the television signal transmitter;

receiving a second pseudo-range, the second pseudo-range determined between the user terminal and a global positioning satellite based on a global positioning signal transmitted by the global positioning satellite; and determining a position of the user terminal based on the first and second pseudo-ranges, a location of the television signal transmitter, and a location of the global positioning satellite.

10. The media of claim 9, wherein determining a position of the user terminal comprises:

adjusting the first pseudo-range based on a difference between a transmitter clock at the television signal transmitter and a known time reference;

adjusting the second pseudo-range based on a relative radial velocity between the global positioning satellite and the user terminal; and determining the position of the user terminal based on the adjusted first and second pseudo-ranges, a location of the television signal transmitter, and a location of the global positioning satellite.

11. An apparatus for determining the position of a user terminal, comprising:

a receiver to receive at the user terminal a broadcast television signal from a television signal transmitter;

a processor to determine a first pseudo-range between the user terminal and the television signal transmitter based on a known component of the broadcast television signal;

wherein the receiver receives at the user terminal a global positioning signal from a global positioning satellite;

wherein the processor determines a second pseudo-range between the user terminal and the global positioning satellite based on the global positioning signal; and wherein a position of the user terminal is determined based on the first and second pseudo-ranges, a location of the television signal transmitter, and a location of the global positioning satellite.

12. The apparatus of claim 11:

wherein the processor determines the position of the user terminal based on the first and second pseudo-ranges, the location of the television signal transmitter, and the location of the global positioning satellite.

13. The apparatus of claim 12, wherein:

the processor adjusts the first pseudo-range based on a difference between a transmitter clock at the television signal transmitter and a known time reference;

the processor adjusts the second pseudo-range based on a relative radial velocity between the global positioning satellite and the user terminal; and the processor determines the position of the user terminal based on the adjusted first and second pseudo-ranges, a location of the television signal transmitter, and a location of the global positioning satellite.

14. An apparatus for determining the position of a user terminal, comprising:

a receiver to receive a first pseudo-range from the user terminal, the first pseudo-range determined between the user terminal and the television signal transmitter based on a known component of a broadcast television signal transmitted by the television signal transmitter;

wherein the receiver receives a second pseudo-range from the user terminal, the second pseudo-range determined between the user terminal and a global positioning satellite based on a global positioning signal transmitted by the global positioning satellite; and a processor to determine a position of the user terminal based on the first and second pseudo-ranges, a location of the television signal transmitter, and a location of the global positioning satellite.

15. The apparatus of claim 14, wherein:

the processor adjusts the first pseudo-range based on a difference between a transmitter clock at the television signal transmitter and a known time reference;

the processor adjusts the second pseudo-range based on a relative radial velocity between the global positioning satellite and the user terminal; and the processor determines the position of the user terminal based on the adjusted first and second pseudo-ranges, a location of the television signal transmitter, and a location of the global positioning satellite.

16. The apparatus of claim 14, further comprising:

an antenna to receive the broadcast television signal; and wherein the antenna receives the global positioning signal.

17. An apparatus for determining the position of a user terminal, comprising:

receiving means for receiving at the user terminal a broadcast television signal from a television signal transmitter;

processing means for determining a first pseudo-range between the user terminal and the television signal transmitter based on a known component of the broadcast television signal;

wherein the receiving means receives at the user terminal a global positioning signal from a global positioning satellite;

wherein the processing means determines a second pseudo-range between the user terminal and the global positioning satellite based on the global positioning signal; and wherein a position of the user terminal is determined based on the first and second pseudo-ranges, a location of the television signal transmitter, and a location of the global positioning satellite.

18. The apparatus of claim 17:

wherein the processing means determines a position of the user terminal based on the first and second pseudo-ranges, the location of the television signal transmitter, and the location of the global positioning satellite.

19. The apparatus of claim 18, wherein:

the processing means adjusts the first pseudo-range based on a difference between a transmitter clock at the television signal transmitter and a known time reference;

the processing means adjusts the second pseudo-range based on a relative radial velocity between the global positioning satellite and the user terminal; and the processing means determines the position of the user terminal based on the adjusted first and second pseudo-ranges, a location of the television signal transmitter, and a location of the global positioning satellite.

20. An apparatus for determining the position of a user terminal, comprising:

receiving means for receiving a first pseudo-range from the user terminal, the first pseudo-range determined between the user terminal and a television signal transmitter based on a known component of a broadcast television signal transmitted by the television signal transmitter;

wherein the receiving means receives a second pseudo-range from the user terminal, the second pseudo-range determined between the user terminal and a global positioning satellite based on a global positioning signal transmitted by the global positioning satellite; and processing means for determining a position of the user terminal based on the first and second pseudo-ranges, a location of the television signal transmitter, and a location of the global positioning satellite.

21. The apparatus of claim 20, wherein:

the processing means adjusts the first pseudo-range based on a difference between a transmitter clock at the television signal transmitter and a known time reference;

the processing means adjusts the second pseudo-range based on a relative radial velocity between the global positioning satellite and the user terminal; and the processing means determines the position of the user terminal based on the adjusted first and second pseudo-ranges, a location of the television signal transmitter, and a location of the global positioning satellite.

22. The apparatus of claim 20, further comprising:

antenna means for receiving the broadcast television signal; and wherein the antenna means receives the global positioning signal.

23. The method of claim 1, further comprising:

transmitting the first and second pseudoranges to a location server configured to determine the position of the user terminal based on the first and second pseudo-ranges, the location of the television signal transmitter, and the location of the global positioning satellite.

24. The method of claim 1, wherein the broadcast television signal is selected from the group consisting of:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal; and an analog television signal.

25. The method of claim 4, wherein the broadcast television signal is selected from the group consisting of:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal; and an analog television signal.

26. The media of claim 6, wherein the method further comprises:

causing transmission of the first and second pseudoranges to a location server configured to determine a position of the user terminal based on the first and second pseudo-ranges, the location of the television signal transmitter, and the location of the global positioning satellite.

27. The media of claim 6, wherein the broadcast television signal is selected from the group consisting of:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal; and an analog television signal.

28. The media of claim 9, wherein the broadcast television signal is selected from the group consisting of:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal; and an analog television signal.

29. The apparatus of claim 11, further comprising:

a transmitter to transmit the first and second pseudoranges to a location server configured to determine the position of the user terminal based on the first and second pseudoranges, the location of the television signal transmitter, and the location of the global positioning satellite.

30. The apparatus of claim 11, wherein the broadcast television signal is selected from the group consisting of:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal; and an analog television signal.

31. The apparatus of claim 14, wherein the broadcast television signal is selected from the group consisting of:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal; and an analog television signal.

32. The apparatus of claim 17, further comprising:

transmitting means for transmitting the first and second pseudoranges to a location server configured to determine a position of the user terminal based on the first and second pseudo-ranges, the location of the television signal transmitter, and the location of the global positioning satellite.

33. The apparatus of claim 17, wherein the broadcast television signal is selected from the group consisting of:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal; and an analog television signal.

34. The apparatus of claim 20, wherein the broadcast television signal is selected from the group consisting of:

an American Television Standards Committee (ATSC) digital television signal;

a European Telecommunications Standards Institute (ETSI) Digital Video Broadcasting-Terrestrial (DVB-T) signal; and a Japanese Integrated Services Digital Broadcasting-Terrestrial (ISDB-T) signal; and an analog television signal.

* * * * *